(12) United States Patent
Savant et al.

(10) Patent No.: US 11,591,831 B2
(45) Date of Patent: Feb. 28, 2023

(54) VEHICLE DOOR ASSEMBLY

(71) Applicant: U-SHIN ITALIA S.P.A., Pianezza (IT)

(72) Inventors: Marco Savant, Pianezza (IT); Anthony Guerin, Pianezza (IT); Antonino Cannavo, Pianezza (IT)

(73) Assignee: U-SHIN ITALIA S.P.A., Pianezza (IT)

( * ) Notice: Subject to any disclaimer, the term of this patent is extended or adjusted under 35 U.S.C. 154(b) by 48 days.

(21) Appl. No.: 17/047,940

(22) PCT Filed: Apr. 12, 2019

(86) PCT No.: PCT/EP2019/059417
§ 371 (c)(1),
(2) Date: Oct. 15, 2020

(87) PCT Pub. No.: WO2019/201770
PCT Pub. Date: Oct. 24, 2019

(65) Prior Publication Data
US 2021/0156179 A1  May 27, 2021

(30) Foreign Application Priority Data

Apr. 17, 2018 (EP) .................................. 18167791

(51) Int. Cl.
| E05B 85/10 | (2014.01) |
| B60J 5/04 | (2006.01) |
| E05B 85/16 | (2014.01) |
| E05B 77/06 | (2014.01) |
| E05B 79/20 | (2014.01) |

(52) U.S. Cl.
CPC ........... *E05B 85/107* (2013.01); *B60J 5/0468* (2013.01); *E05B 77/06* (2013.01); *E05B 85/16* (2013.01); *E05B 79/20* (2013.01)

(58) Field of Classification Search
CPC ...... E05B 85/103; E05B 85/107; E05B 85/10; E05B 85/14; E05B 85/16; E05B 85/18;
(Continued)

(56) References Cited

U.S. PATENT DOCUMENTS

| 2013/0121008 A1* | 5/2013 | Muller ..................... B60Q 1/26 292/336.3 |
| 2016/0273247 A1 | 9/2016 | Fujiwara |
| 2016/0290018 A1* | 10/2016 | Hamacher ............. E05B 85/103 |

FOREIGN PATENT DOCUMENTS

| CN | 101802329 A | 8/2010 |
| CN | 102086717 A | 6/2011 |

(Continued)

OTHER PUBLICATIONS

Machine translation and numbered paragraphs version of CN 105649437 description (Year: 2016).*

(Continued)

*Primary Examiner* — Christine M Mills
*Assistant Examiner* — Christopher F Callahan
(74) *Attorney, Agent, or Firm* — Oblon, McClelland, Maier & Neustadt, L.L.P.

(57) ABSTRACT

The invention relates to a vehicle door handle (1), comprising a handle frame (5) to be attached on a vehicle door panel (100), handle lever (3) with a total length L movable with respect to the handle frame (5) between at least one rest position (F, R) and an opening position (O) in rotation around a handle lever axis (A) at one of its longitudinal ends, said handle lever (3) having an axially protruding axial finger (35), characterized in that it further comprises a kinematic lever (37), rotatively mobile with respect to the handle frame (5) around a kinematic lever axis (B) between a rest position and an active position, said kinematic lever (37) comprising a first radial arm (39), adapted to interact with a latch mechanism, configured to unlatch the door when the kinematic lever (37) reaches its active position, and a second radial arm (41), intersecting a path of the axial finger (35) of the handle lever (3) and being pushed by said axial finger (35) during rotation of the handle lever (3), so that when the handle lever (3) reaches the opening (O) position, (Continued)

the kinematic lever (37) reaches its active position, wherein the kinematic lever (37) is set in the handle frame (5) in a position axially above the handle lever (3) and with its rotational kinematic lever axis (B) positioned in a middle section of the handle lever (3), radially apart from the handle lever axis (A) at a distance d, verifying $0.9L \geq d \geq 0.1L$.

13 Claims, 3 Drawing Sheets

(58) Field of Classification Search
CPC .......... E05B 77/02; E05B 77/04; E05B 77/06; E05B 81/90; E05B 81/06; E05B 81/34; E05B 81/76; E05B 79/20; E05B 55/00; E05B 55/003; E05B 55/006; B60J 5/0468; Y10T 292/57; Y10S 292/31
See application file for complete search history.

(56) References Cited

FOREIGN PATENT DOCUMENTS

| | | | |
|---|---|---|---|
| CN | 102202926 A | | 9/2011 |
| CN | 204175066 U | * | 2/2015 |
| CN | 105275287 A | | 1/2016 |
| CN | 105649437 A | | 6/2016 |
| CN | 105849348 A | | 8/2016 |
| CN | 105917063 A | | 8/2016 |
| CN | 106256982 A | | 12/2016 |
| CN | 107735540 A | | 2/2018 |
| DE | 10 2016 104 716 A1 | | 9/2017 |
| FR | 3023865 A1 * | 1/2016 | ............. E05B 77/06 |
| WO | WO-2012028325 A2 * | 3/2012 | ............. E05B 65/10 |
| WO | WO 2015/068422 A1 | | 5/2015 |
| WO | WO-2017012728 A1 * | 1/2017 | ............. E05B 77/06 |

OTHER PUBLICATIONS

International Search Report dated Jul. 16, 2019 in PCT/EP2019/059417 filed Apr. 12, 2019.
Chinese Office Action dated Feb. 18, 2022 in Chinese Patent Application No. 201980025844.2 (with English translation), 16 pages.
Combined Chinese Office Action and Search Report dated Jul. 5, 2022 in Patent Application No. 201980025844.2 (with English language translation), 18 pages.

* cited by examiner

VEHICLE DOOR ASSEMBLY

The present invention concerns a vehicle door assembly, in particular of the type with a flushing door handle lever.

Such vehicle door handle assemblies comprise an electric motor which, when actuated, moves the handle lever between a flush position and a ready position. In the flush position, the handle lever is flush with the exterior surface of the door body. In the ready position, the handle lever is protruding from said exterior surface, so as to be graspable by a user.

Once the user grasps the handle lever in its ready position, he can unlatch the door by pulling the lever in a further protruding unlocking position, in which the handle door lever interacts (via a Bowden cable, a rotating pin or a gear mechanism) with a latch mechanism and unlatches the door.

A handle lever spring brings the handle lever back in its ready position when the user releases the handle lever. The electric motor may also move the handle lever from the ready position to the flush position after opening or closing the door.

Such door handle assemblies also comprise a back-up mechanism, to enable the opening of the door in case of, for example, electric motor or car battery failure, that is when the electric motor cannot be actuated. This mechanism comprises for example a push-push mechanism, in which the user pushes the handle lever inwards from its flushing position until reaching a clicking position in which a preloaded spring is released. Said preloaded spring, when released, pushes the handle lever from the inward clicking position in the protruding ready position.

Once the user accesses the vehicle in back-up mode, the battery will generally be recharged, and/or the motor failure will be lifted and normal, electric, actuation can be resumed.

To avoid an opening of the handle in case of a traffic collision, in particular a lateral impact, the handle also comprises inertial locking systems, generally at least a reversible one and/or an irreversible one, which comprise a rocker arm carrying an inertial mass.

The reversible one engages with a mobile element of the handle to prevent opening of the handle when the handle undergoes accelerations above a threshold value, and returns to a rest configuration when the accelerations decrease.

The irreversible one engages with the handle mechanism at higher acceleration values and does not spontaneously return to its rest position, which prevents opening of the doors due to vibrations and the vehicle rebounding.

Furthermore, the door handle can comprise other modules such as an antenna module to communicate with a remote or RFID card or a light module to illuminate portions of the handle, which all require space.

The handle may comprise an important number of elements, which occupy an important space inside the handle, while the chain of elements transmitting the actuation from the handle lever to the locking mechanism increases in complexity.

Consequently, there is a need for a simple, compact architecture of the handle, with a short kinematic chain from the handle lever to the locking mechanism, namely the latch.

In order to address the aforementioned problems, the invention proposes a vehicle door handle, comprising:
- a handle frame to be attached on a vehicle door panel,
- a handle lever with a total length L movable with respect to the handle frame between at least one rest position and an opening position in rotation around a handle lever axis at one of its longitudinal ends, said handle lever having an axially protruding axial finger, further comprising:
- a kinematic lever, rotatively mobile with respect to the handle frame around a kinematic lever axis positioned in a middle section of the handle lever, radially apart from the handle lever axis at a distance d, verifying $0.9L \geq d \geq 0.1L$, between a rest position and an active position, said kinematic lever comprising:
  - a first radial arm, adapted to interact with a latch mechanism, configured to unlatch the door when the kinematic lever reaches its active position,
  - a second radial arm, intersecting a path of the axial finger of the handle lever and being pushed by said axial finger during rotation of the handle lever, so that when the handle lever reaches the opening position, the kinematic lever reaches its active position, characterized in that the kinematic lever is set in an axially offset position with respect to the handle lever and in that it further comprises at least one reversible inertial safety system mounted on the handle frame, comprising a rocker arm which carries an inertial mass, the rocker arm being pivotally mounted between a rest position and a blocking position it reaches in case of a collision, and in which the rocker arm prevents the rotation of the kinematic lever.

Such a handle is compact, with a reduced number of transmission elements, which simplify its assembling process while being potentially less prone to failure.

The handle may further present one or more of the following characteristics, taken separately or in combination.

It further comprises a bowden cable with an inner cable having one end that is bound to the first radial arm, and another end being adapted to interact with the latch mechanism.

The handle lever further comprises an actuator comprising an electric motor which moves the handle lever between a flush position in which it is flush with an exterior door panel surface and a ready position in which it is protruding and graspable by a user.

It further comprises a comprises a push-push unit, comprising at least one constrained push-push spring which pushes when released a push-push finger which rests against a push-push lever, the rotation of which causes the handle lever to reach the ready position, and wherein the handle lever is further movable into an inwards clicking position in which the push-push spring is released.

The inertial mass is formed as an axial finger, which, when the rocker arm reaches the active position, is placed on the trajectory of the first or second radial arm of the kinematic lever, so as to block the motion of said kinematic lever.

It further comprises an irreversible inertial system mounted on the handle frame, comprising an inertial rotating element, movable between a rest position in which it is constrained by a preconstrained metal blade and an active position reached by deforming the metal blade wherein the metal blade comprises an opening, and the inertial rotating element comprises a lug, which engages in the opening when the inertial rotating element reaches the active position, and wherein the inertial rotating element comprises blocking means, which, when in active position, prevent the motion of the kinematic lever.

The irreversible inertial security system reaches its active position at higher acceleration values than the reversible inertial security system, and the irreversible inertial security system prevents the motion of the kinematic lever in that it prevents the reversible inertial security system from returning to its rest position.

The handle lever comprises a counterweight, extending on the opposite side of the lever axis with respect to a graspable body of the handle lever, carried by at least one radial counterweight arm.

It further comprises an antenna module.

It further comprises a light module configured to illuminate an outline of the handle lever or a portion of the handle lever.

In a preferred embodiment, the handle lever axis, the kinematic lever axis and the rotation axis of the reversible or irreversible inertial systems are parallel.

The handle lever may comprise an articulation end surrounding the rotational axis, which comprises a hollow space in which a handle spring is housed, the handle spring generating a torque bringing the handle lever back in flush position.

The radially protruding finger, the first radial arm and/or the second radial arm may comprise predetermined breaking points.

The handle lever may comprise a graspable body, which the user will grasp, and a hidden body, hidden in the frame and located radially close to the axis lever, so that the graspable body is totally protruding when the handle lever is in open or ready position.

Other characteristics and advantages of the invention will appear at the reading of the following description, given in an illustrative and not limiting fashion, of the following figures, among which.

Though the figures refer to precise embodiments of the invention, other embodiments may be obtained by combining or altering slightly the represented embodiments, said new embodiments are also within the scope of the invention.

Figure 1:
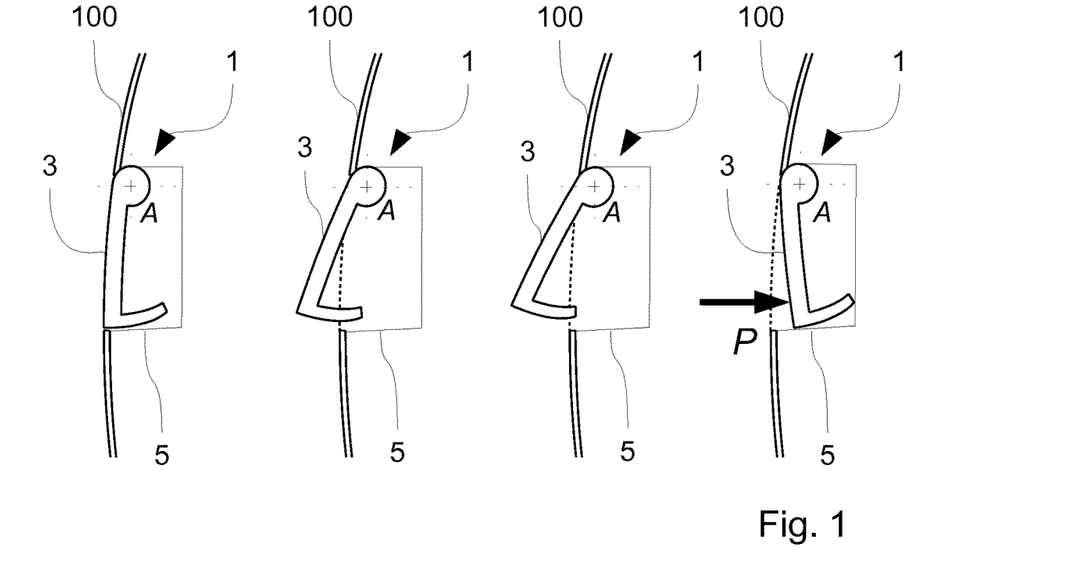
FIG. 1 is a schematic cut away of a vehicle door with a handle comprising a handle lever represented in different positions.

FIG. 1 shows a series of schematic cutaways of a vehicle door panel 100 having a built-in door handle 1. The door panel 100 forms an exterior surface of the vehicle, the door handle 1 is essentially represented by its handle lever 3 (the part meant to be grasped and set in motion by a user) and a handle frame 5 (part that remains stationary with respect to the door panel 100 during actuation).

The terms like "inwards", "outwards" and equivalents are defined with respect to the vehicle interior and exterior, assuming the handle 1 is an exterior handle where the lever 3 is pulled outwards to open the door panel 100.

In the first cutaway of FIG. 1 (from left to right), the handle lever 3 is in a flushing position. In said flushing position, the outer surface of the handle lever 3 is flushing with the door panel 100. Said flushing position is adopted when the vehicle is driving and when it is parked for longer times. In flushing position, the handle lever 3 is less likely, when parked, to be caught by passers-by, accidentally or not, and air drag is reduced when driving. In the flushing position, the handle lever 3 also appears integrated in the door panel 100 in a pleasant and discrete way.

In the second cutaway of FIG. 1, the handle lever 3 is in a ready position. In said ready position, the handle lever 3 has rotated outwards by a predefined angle (20 to 45° for example) around a handle lever axis A, so as to be graspable by the user. Said ready position is adopted when the user approaches the vehicle or causes unlocking of the doors, for example using a remote control integrated in a key or a RFID security token. In said position the handle lever 3 is available and graspable for the user, but the handle is still latched.

The lever axis A defines an axial direction, while the planes and directions orthogonal to said axis A are defined as radial. It is to be noted that the axis A is preferably located in front of the protruding area (towards the car motor in front-wheel drive or front engine configuration vehicles) so as to obtain a ready and open handle lever 3 totally protruding when motor driven to ready position, this reduces dust and water intrusion. Having the rotation axis inside the protruding area leads to a hole appearing on the other side of the handle lever with regards to the rotation axis.

In the third cutaway of FIG. 1, the handle lever 3 is in an open position. Compared to the ready position, the handle lever 3 has been rotated further outwards (40° to 60° and more) by the user, and the handle lever interacts with a latch mechanism to unlatch the door panel 100, which is consequently unlatched and ready to be opened by pulling further on the handle lever 3.

In the event of a mechanical or electrical failure of the mechanism that drives the lever 3 from the flushing position to the ready position, the user can push the lever 3 inwards with respect to the door panel 100, as in the fourth cutaway of FIG. 1, by applying inwards directed pressure P on the handle lever 3. The handle lever 3 is then in a position herein called clicking position, where a mechanical interaction (a "click") releases a spring of a push-push unit that drives the lever 3 in ready position without actuation of a motor.

The invention is in particular indicated for such a flushing handle, but can also be used in the case of a classical door handle with only a rest and an open position, which the user sets in motion without the assistance of a motor.

Figure 2:
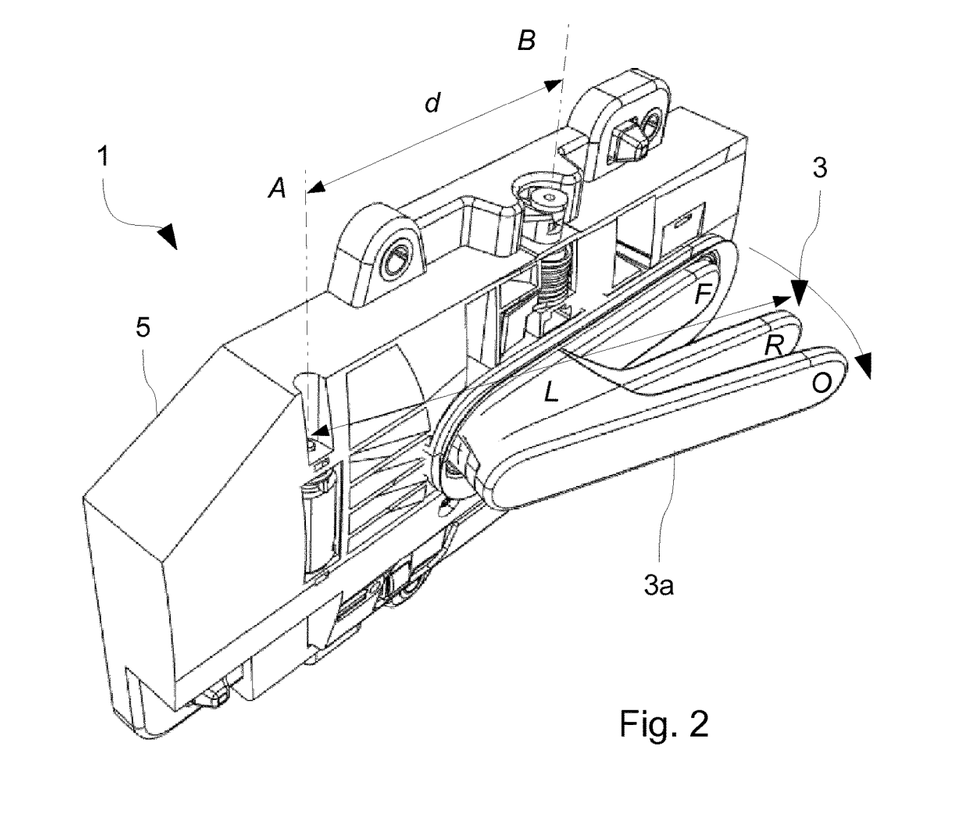
FIG. 2 is a schematic view of a vehicle door handle from the outside.

FIG. 2 shows the door handle 1 taken out of the vehicle door, viewed from the outside. The frame 5 covers the visible mechanisms and modules, but a graspable body 3a, corresponding to the visible portion of the handle lever 3 is apparent.

The handle lever 3 is represented in three positions: flushing F, ready R and open O. An arrow illustrates the opening motion from flush F to open O.

Figure 3:
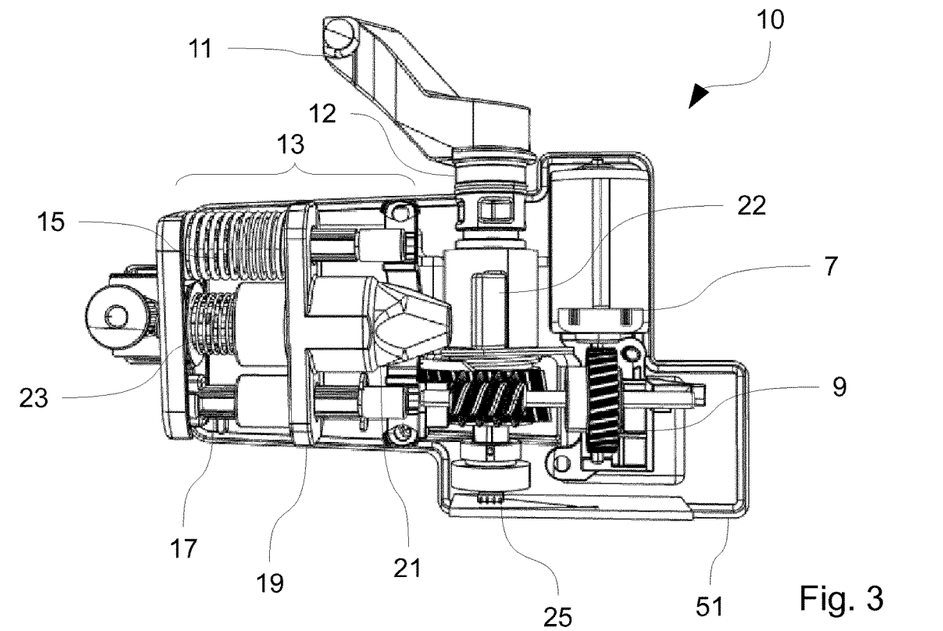
FIG. 3 is a schematic view of a vehicle door handle actuator, controlling part of the motion of the handle lever.

The movement from flush F to ready R is caused by an actuator 10 comprising a motor 7 (see FIG. 3). The user, after grasping the handle lever 3 in the ready position R, pulls the handle lever 3 to reach the open position O, thereby actuating a latch mechanism and releasing the vehicle door panel 100. By further pulling the handle lever 3, the user swings the whole vehicle door panel 100 and thereby opens the door.

The flush F and ready R positions can be considered rest positions: when the handle lever 3 is in said positions, the door latch mechanism is not actuated and the door panel 100 remains latched.

FIG. 3 is a view of the door handle actuator 10, viewed from inside. The actuator 10 causes the motion of the handle lever 3 using spring action and electric power drawn from the vehicle battery or an independent battery in the door. In FIG. 3, the handle lever 3 is rotatively mobile with respect to the actuator frame 51, which is to be attached to a handle frame 5 of the handle 1 (see FIG. 4), said handle frame 5 is then itself attached to the door panel 100.

The actuator 10 forms a separate module, which can be shipped, manipulated and mounted separately. The assembling and maintenance of the door handle 1 is consequently easier and potentially cheaper.

In a housing of the actuator frame 51 is an electric motor 7 with a reduction mechanism 9. The electric motor 7 is activated by injection of electric current, in particular from a vehicle battery or an independent battery in the door. The reduction mechanism 9 adapts the rotary output motion of the electric motor 7 by reducing rotational speed and increasing the torque values. The reduction mechanism 9 sets the handle lever 3 in motion using an actuator lever 11, in particular from the flushing position F to the ready position R.

The reduction mechanism 9 comprises for example one or more reduction stages, with reduction gears and/or worm and gear systems.

The reduction mechanism 9 sets an actuator lever 11 in motion, which rests against the handle lever 3 itself (see FIGS. 4 to 6) so as to push it during its motion at least on a portion of the opening movement, in particular from flush F to ready R.

The handle lever 3 returns to the flush position F when the actuator lever 11 is rotated in reverse motion, due to a handle spring 33 (see FIG. 4) returning to a rest configuration, and which presses the handle lever against the actuator lever 11 during the motions from flush F to ready R. From ready R to open O positions, the user acts against the torque of the handle spring, which in turns ensures the return of the handle lever 3 in ready R position once the user releases it.

The actuator 10 also comprises a push-push unit 13, comprising at least one push-push spring 15, placed around guiding rods 17. The push-push springs 15 push when released a slider 19 carrying a push-push finger 21 which rests against a push-push lever 22, the rotation of which causes the actuator lever 11 to rotate. The push-push finger 21 is in particular made of rubber, soft plastic or any shock absorbing material.

The represented embodiment comprises two push-push springs 15 and two guiding rods 17. Only one push-push spring 15 is represented so as to make one of the guiding rods 17 visible.

The springs 15 and guiding rods 17 are placed on each side of a release mechanism 23, which, when being compressed (clicking position), releases the slider 19 which is then pushed by the springs 15 along the guiding rods 17, pushing the handle lever 3 in ready position R.

The rotational position of the actuator lever 11 is detected by positioning means 25, on the lower side of a shaft 12 carrying the lever 11. Said positioning means 25 comprise, for example a magnetic index and a magnetic sensor (e.g. a Hall effect sensor). The magnetic index rotates with the actuator lever 11, the magnetic sensor then determinates the rotational position of the magnetic index, which indicates a position of the actuator lever 11, and thus of the handle lever 3. Such positioning means have an improved accuracy when attached directly to the actuator lever 11.

Figure 4:
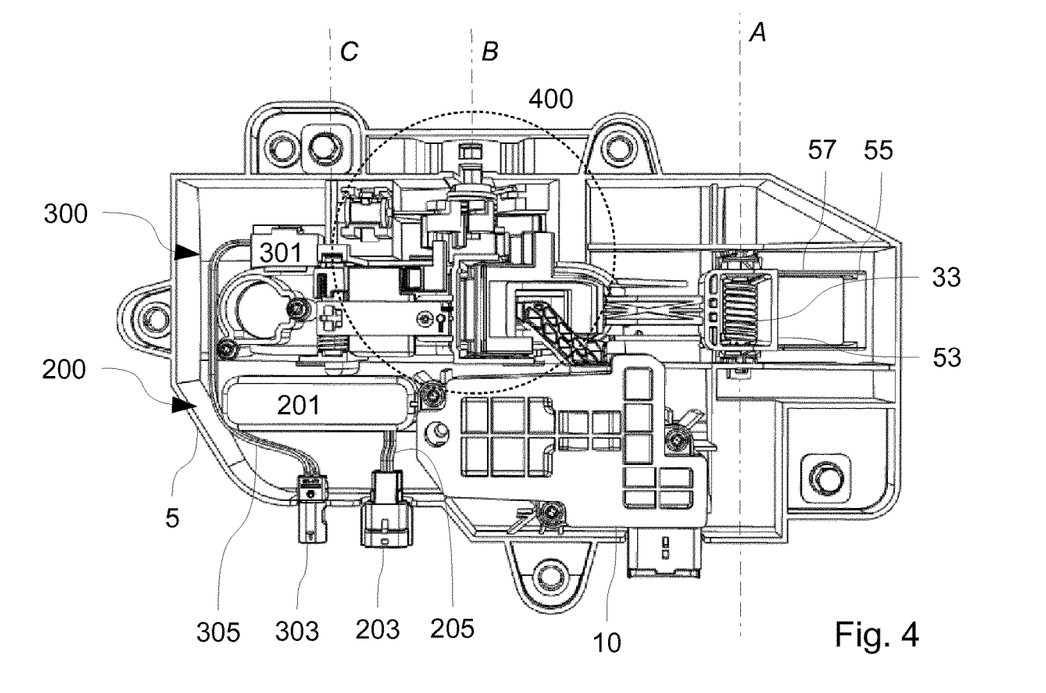
FIG. 4 is a schematic view of a vehicle door handle from the inside, with different functional modules visible in a common frame.
Figure 5:
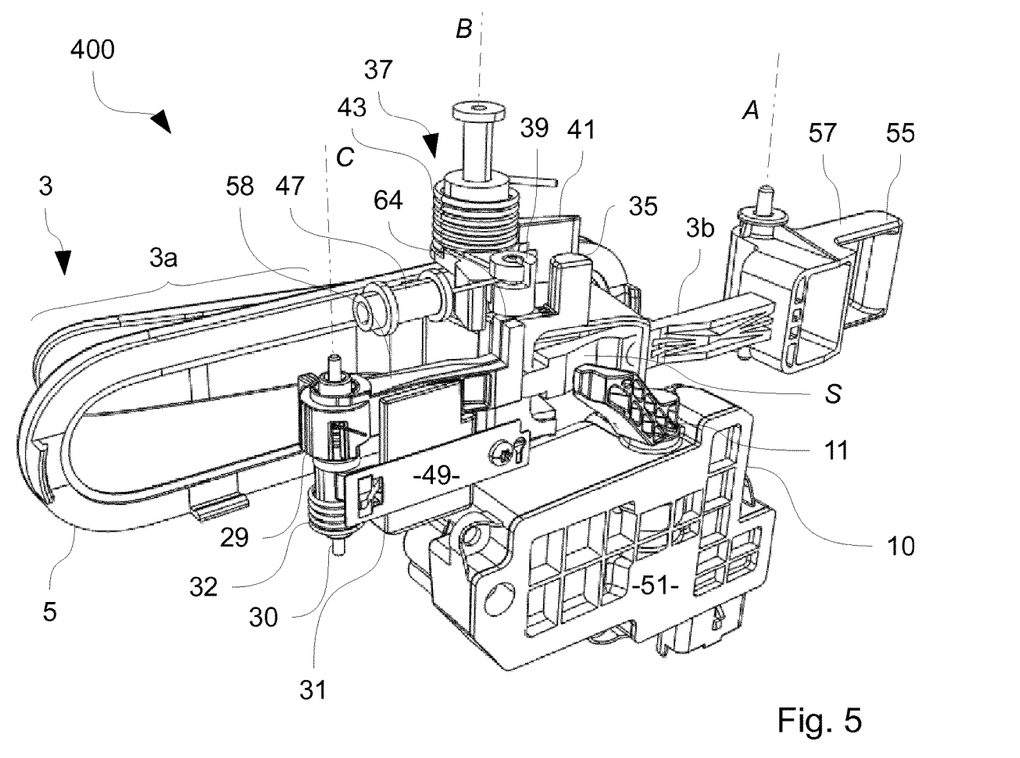
FIG. 5 is a schematic view of the actuator elements for the handle of FIGS. 1 and 3, which control the motion of the handle lever.

FIG. 4 is a view of the assembled door handle 1 from the inside, showing the different modules therein. FIG. 5 is a view from the inside of the elements of the handle 1 responsible for its motion and the safety locking of said handle 1.

The handle frame 5 houses a variety of modules comprising: an antenna module 200, a lighting module 300, the handle lever 3 and an opening mechanism 400 connected to said handle lever 3.

The antenna module 200 comprises an antenna 201, a connector 203 and connecting cables 205, connecting the antenna 201 and the connector 203.

The antenna 201 is for example a RFID (Radio Frequency IDentification) antenna. The antenna 201 communicates with a transponder on the key or authentication token worn by the user when said transponder enters a detection space close to the door.

The antenna 201 may also comprise a capactitive antenna, which detects the presence of a body part of the user (a hand generally) in close proximity of the handle lever 3. An authentication process may then be started only when the proximity of the user is detected.

The connector 203 ensures the electrical supply to the antenna 201 and connects said antenna 201 to an electronic control unit (ECU) of an electrical and/or digital system of the vehicle.

The light module 300 comprises a light generating unit 301, a lighting connector 303 and connecting cables 305, connecting the light generating unit 301 and the connector 303.

The light generating unit 301 comprises for example a set of light emitting diodes, and several light guides, which guide light generated by the diodes to specific areas, for example an outline of the handle lever 3, or a portion of said lever 3 itself. The guided light is then used to highlight the handle lever 3 and/or for decorative purposes.

The light emission can for example serve as signal to the user that the approach of the security token has been registered, and to allow said user to grasp the handle lever 3 safely and quickly even in dark areas.

The connector 303 ensures the power supply for the light generating unit 301, in particular through electric current drawn from the vehicle battery or an independent battery in the door and connects said light generating unit 301 to an electronic control unit (ECU) of an electrical and/or digital system of the vehicle.

The door handle 1 comprises an actuation mechanism 400, which encompasses different elements causing and/or preventing the motion of the handle lever 3 in different situations.

One can consequently appreciate how many different modules are to be intergrated inside the door handle 1.

The actuation mechanism 400 and the handle lever 3 are represented separately in FIG. 5. The actuation mechanism 400 comprises in this particular embodiment an actuator 10 as described in relationship with FIG. 3, a portion of the handle lever 3, a reversible inertial system 29, and an irreversible inertial system 31.

Also represented in FIG. 5 is a portion of the frame 5, in particular the portion directly surrounding a visible body 3a of the handle lever 3.

As visible in FIG. 5, the actuator lever 11 rests against an inner surface S of the handle lever 3 (in flush F, ready R and intermediary positions between the two), so that its rotation in the outwards direction causes the motion of the handle lever 3 from flush F to ready R.

The actuation mechanism 400 further comprises a handle spring 33 (see FIG. 4) which causes the handle lever 3 to return to its flush F position, when the actuator lever 11 rotates inwards, and to return to the ready position R when the user releases it from the open position O. The handle spring 33 is more generally responsible for the torque that brings the handle lever 3 back inwards.

The handle lever 3 is also brought back from the open position O to the ready position R by the handle spring 33 when the user releases said handle lever 3, in particular after opening the vehicle door panel 100.

The handle lever 3 presents in a relatively central portion of its body an axially protruding finger 35, which protrudes in the upwards direction in FIG. 5.

The actuation mechanism 400 also comprises a kinematic lever 37 rotatively mobile with respect to the handle frame 5 around a kinematic lever axis B between a rest position (represented in FIG. 5) and an active position.

The kinematic lever 37 comprises two radial arms: a first radial arm 39, adapted to interact with a latch mechanism and a second radial arm 41, configured to interact with the axially protruding finger 35.

The kinematic lever 37 is placed in an axially offset position with respect to the handle lever 3, here above said handle lever 3 (with the lever axis A considered vertical), so that the second radial arm 41 intersects the path of the axially protruding finger 35 of the handle lever 3 during the motion of the handle lever 3.

Other embodiments foresee that the kinematic lever 37 is placed axially under the handle lever 3.

The rotational axes B of the kinematic lever 37, and A of the handle lever 3 are parallel. The kinematic lever 37 is in a relatively central position with regard to the handle lever 3 in that, with L the total length of the handle lever 3 from its free end to the rotational axis A (see FIG. 6 in particular), the axis B is placed at a radial, longitudinal distance d of around L/2 from the axis A, or more generally, at a distance d verifying 0.9L≥d≥0.1L or 0.8L≥d≥0.2L; and in particular 3L/4≥d≥L/4.

The first radial arm 39 is attached to one end of the inner cable of a Bowden cable 47, which is connected to a latch mechanism (not represented). In the active position, the first radial arm 39 pulls on the inner cable of the Bowden cable 47, the other end of which is connected to the latch mechanism, so that when the kinematic lever 37 reaches its active position, the locking mechanism releases the door.

The return of the kinematic lever 37 to its rest position is ensured by a kinematic spring 43, here a coil spring wrapped around a shaft 45 of the kinematic lever 37. One end of the kinematic spring 43 rests against the handle frame 5 (only partially visible in FIG. 5), and the other is bound to one of the radial arms 39, 41, here in particular the first one 39.

In particular, the kinematic lever 37 is in its rest position when the handle lever 3 is in the flush F and ready R positions (and the intermediary positions). In the ready position R the axially protruding finger 35 and the second radial arm 41 come in contact.

Figure 6:
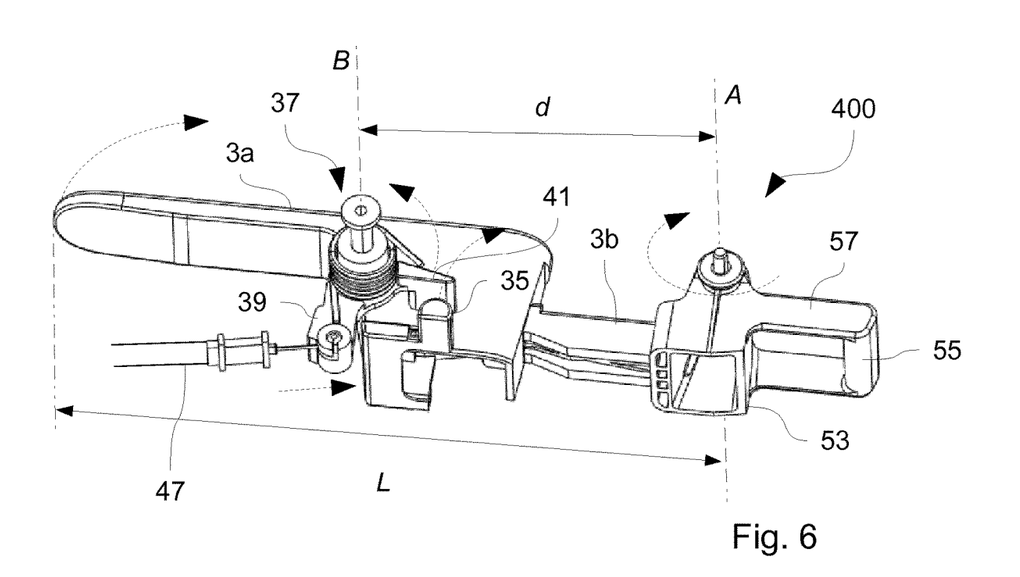
FIG. 6 is a schematic representation of the kinematic chain causing the unlatching of the door when pulling the lever, In all figures, the same references apply to the same element.

The opening motion from ready R to open O of the handle lever 3 is more clearly visible in FIG. 6. In FIG. 6, the handle lever 3 is in the ready position R, and the kinematic lever 37 is in its rest position. The second radial arm 41 of said kinematic lever 37 thus rests against the axially protruding finger 35 of the handle lever 3.

The user pulls the handle lever 3 outwards (leftmost circular arrow), to bring said lever 3 from the ready position R to the open position O through rotation of the whole handle lever 3 around axis A (circular arrow around said axis A).

The rotation of the handle lever 3 causes the axially protruding finger 35 to follow a circular arc path (circular arc arrow at said finger 35). The axially protruding finger 35 drags the second radial arm 41 of the kinematic lever 37 in its outward motion due to mutual contact (circular arc arrow at said radial arm 41). This causes the whole kinematic lever 37 to rotate around axis 8 (circular arrow around said axis 8).

The kinematic lever 37 rotates with the motion of the handle lever 3 until said handle lever 3 reaches the opening position O, at which point the kinematic lever 37 reaches its active position.

During the rotation of the kinematic lever 37, the first radial arm 39 pulls on the inner cable of the Bowden cable 47 (straight arrow at the radial end of said second arm 41), until, when reaching the active position, the inner cable is sufficiently pulled to cause a release of the door by the lock mechanism connected to the other end of the Bowden cable 47.

The inertial systems both reversible 29 and irreversible 31 are used to block the motion of the handle lever 3 due to accelerations caused by a traffic collision, in particular a lateral impact. Their presence is in essence non obligatory for the functioning of the door handle 1. However, their presence represents an additional security feature.

The accelerations due to an impact can, in absence of inertial security systems 29, 31, pull the handle lever 3 in the outwards, opening direction. This outwards motion can in turn cause an opening of the door panel 100.

The opening of the door may aggravate the outcome of the collision, by either allowing a passenger to be ejected from the vehicle interior, one or more limbs of said passenger to poke out, or by allowing exterior objects to enter the inner space of the vehicle. Also, an open door is more likely to be ripped of, for example in case of a rollover, and can consequently injure bystanders or remain as obstacle on the road for other oncoming vehicles.

The reversible inertial system 29 is mounted on the frame 5. It comprises a rocker arm 58, rotatively free with respect to an inertial system axis C and which carries an inertial mass at the far end of said rocker arm 58. The axis C, in this particular embodiment, is parallel to the axes A and B of the handle lever 3 and of the kinematic lever 37.

The rocker arm 58 is pivotally mounted between a rest position and a blocking position. In the rest position, the reversible inertial system 29 does not interfere with the lever 3 motion. In the active position, the reversible inertial system 29 prevents the rotation of the kinematic lever 37.

The rocker arm 58 comprises in particular an axial finger 64 forming an inertial mass at its radial end that intersects the path of the first radial arm 39 of the kinematic lever 37, when in blocking position.

The reversible inertial safety system 29 comprises a safety spring (not visible), in particular a coil spring around a central shaft 30, which brings the rocker arm 58 back in the rest position when not solicited by accelerations. By tuning the safety spring torque value, the inertial mass 64 and the length of the rocker arm 58, it is possible to select an acceleration value at and above which the rocker arm 58 reaches the blocking position.

The reversible inertial system 29 is in particular configured to block the actuation of the door handle 1 when undergoing accelerations higher than 3 to 5 g, where g is the standard gravity value (approximatively $9.81 \text{ m·s}^{-2}$).

The irreversible inertial safety system 31 is in this particular embodiment of the type described in WO 2006/003197, hereby added as a reference.

Such an irreversible inertial safety system 31 comprises an inertial rotating element around axis C, in form of, for example, a cylinder with a shoulder. When not undergoing accelerations, the cylinder is in a first, rest position, in which it is constrained by a preconstrained metal blade 49. When undergoing an acceleration, the cylinder reaches an active position by deforming the metal blade 49 when sufficient forces are reached. The metal blade 49 comprises an opening, and the cylinder comprises a lug, which engages in the opening when the cylinder reaches an active position.

Once the cylinder reaches its active position, it will not return to the rest position without manual intervention on the components.

By tuning the force applied by the preconstrained metal blade 49, the form and mass of the cylinder and by adding a second safety spring 32 which applies a predefined torque on the cylinder, it is possible to tune the acceleration domain in which the cylinder reaches its active position. In particular, the irreversible inertial safety system 31 is configured to reach its active position when undergoing accelerations above the accelerations in which the reversible inertial safety system 29 reaches its active position.

For example, with a reversible system 29 engaging at 5 g, the irreversible inertial system 31 will reach active position when undergoing accelerations higher than 8 to 10 g.

Attached to the cylinder are blocking means, which, when in active position, prevent the motion of the kinematic lever 37. In the present embodiment, the irreversible inertial safety system 31 prevents the reversible inertial safety system 29 from returning to its rest position, using for example a protruding shoulder on the cylinder which pushes on the rocker arm 58 when in active position.

In both cases (reversible and irreversible) the inertial safety systems 29, 31 interact with the kinematic lever 37, which forms a privileged interaction point.

In particular, the radially protruding finger 35, the first radial arm 39 and/or the second radial arm 41 can easily be fitted with predetermined breaking points so as to act as further failsafes in case of very high impact acceleration values.

By tuning the force required to break at the predetermined points, a configuration can be reached in which the first radial arm 39 connected to the Bowden cable 47 will be released (by breaking) with regards to the motion of the handle lever 3 at lower acceleration values than those where the kinematic lever 37 is likely to break free from the inertial safety systems 29, 31.

In such cases, the motion of the handle lever 3 due to inertia will not cause the motion of the part of the first radial arm 39 connected to the Bowden cable 47 and thus actuation of the lock mechanism.

Due to the fact that the inertial safety systems 29, 31 interact with the kinematic lever 37, they can be placed at the same axial height and parallel to the handle lever 3, with only an inward oriented axial offset, so that a compact overall architecture is obtained for the handle 1.

As depicted in particular in FIG. 6, the handle lever 3 has an elongated graspable body 3a with one free end, which protrudes on the outside in the ready R and open O positions. The handle lever 3 also comprises a hidden body 3b, radially close to the axis A, with an articulation end 53 surrounding said rotational axis A, which is covered and hidden by the frame 5 when the handle 1 is assembled.

The articulation end 53 comprises a hollow space in which the handle spring 33 is housed, here in form of a cubic or parallelepipedic hollowed out shape.

The graspable body 3a and the hidden body 3b are radial prolongations of each other, and both situated on the same side of the rotational axis A of the handle lever 3. The hidden body 3b is located radially close to the axis lever A, so that the graspable body 3a is totally protruding when the handle lever 3 is in open O or ready R position.

The handle lever 3 further comprises a radial prolongation on the side opposite the graspable and hidden bodies 3a, 3b, comprising a counterweight 55, carried by two counterweight arms 57.

The counterweight arms 57 are in prolongation of the handle lever bodies 3a, 3b, on the opposite side with respect to the axis A. The counterweight 55 is attached to the far axial ends of the counterweight arms 57, one being axially on top of the counterweight 55, the other counterweight arm 57 being axially at the bottom of the counterweight 55.

Therefore, during a collision, the torque caused by the acceleration exerted on the lever body 3a, 3b is at least partially cancelled out by the torque caused by the acceleration exerted on the counterweight 55.

The presence and disposition of the kinematic lever 37 in a relatively central position ($3L/4 \geq d \geq L/4$) with regard to the handle lever 3 frees up space on said handle lever 3 around the rotational axis A, in particular for the handle spring 33, and for a counterweight 55.

The invention claimed is:

1. A vehicle door handle, comprising:
a handle frame to be attached on a vehicle door panel,
a handle lever with a total length L movable with respect to the handle frame between at least one rest position and an opening position in rotation around a handle lever axis at one of its longitudinal ends, said handle lever having an axially protruding axial finger,
further comprising:
a kinematic lever, rotatively mobile with respect to the handle frame around a kinematic lever axis positioned in a middle section of the handle lever, radially apart from the handle lever axis at a distance d, verifying $0,9L \geq d \geq 0,1L$, between a rest position and an active position, said kinematic lever comprising:
a first radial arm, adapted to interact with a latch mechanism, configured to unlatch the door when the kinematic lever reaches its active position,
a second radial arm, intersecting a path of the axial finger of the handle lever and being pushed by said axial finger during rotation of the handle lever, so that when the handle lever reaches the opening position, the kinematic lever reaches its active position,
wherein the kinematic lever is set in an axially offset position with respect to the handle lever and in that it further comprises at least one reversible inertial safety system mounted on the handle frame, comprising a rocker arm which carries an inertial mass, the rocker arm being pivotally mounted between a rest position and a blocking position it reaches in case of a collision, and in which the rocker arm prevents the rotation of the kinematic lever, and
wherein the radially protruding finger of the handle lever, the first radial arm and/or the second radial arm comprise predetermined breaking points.

2. The door handle according to claim 1, wherein it further comprises a bowden cable with an inner cable having one end that is bound to the first radial arm, and another end being adapted to interact with the latch mechanism.

3. The door handle according to claim 1, wherein the handle lever further comprises an actuator comprising an electric motor which moves the handle lever between a flush position in which it is flush with an exterior door panel surface and a ready position in which it is protruding and graspable by a user.

4. The door handle according to claim 3, wherein it further comprises a comprises a push-push unit, comprising at least one constrained push-push spring which pushes when released a push-push finger which rests against a push-push lever, the rotation of which causes the handle lever to reach the ready position, and wherein the handle lever is further movable into an inwards clicking position in which the push-push spring is released.

5. The door handle according to claim 1, wherein the inertial mass when the rocker arm reaches the blocking position, is placed on the trajectory of the first or second radial arm of the kinematic lever, so as to block the motion of said kinematic lever.

6. The door handle according to claim 1, wherein it further comprises an irreversible inertial system mounted on the handle frame, comprising an inertial rotating element, movable between a rest position in which it is constrained by a preconstrained metal blade and an active position reached by deforming the metal blade wherein the metal blade comprises an opening, and the inertial rotating element comprises a lug, which engages in the opening when the inertial rotating element reaches the active position, and wherein the inertial rotating element comprises blocking means, which, when in active position, prevent the motion of the kinematic lever.

7. The door handle according to claim 6, wherein the irreversible inertial security system reaches its active position at higher acceleration values than the reversible inertial security system, and in that the irreversible inertial security system prevents the motion of the kinematic lever in that it prevents the reversible inertial security system from returning to its rest position.

8. The door handle according to claim 6, wherein the handle lever axis, the kinematic lever axis and the rotation axis of the reversible or irreversible inertial system are parallel.

9. The door handle according to claim 1, wherein the handle lever comprises a counterweight, extending on the opposite side of the lever axis with respect to a graspable body of the handle lever, carried by at least one radial counterweight arm.

10. The door handle according to claim 1, wherein it further comprises an antenna module.

11. The door handle according to claim 1, wherein it further comprises a light module configured to illuminate an outline of the handle lever or a portion of the handle lever.

12. The door handle according to claim 1, wherein the handle lever comprises an articulation end surrounding the rotational axis, which comprises a hollow space in which a handle spring is housed, the handle spring generating a torque bringing the handle lever back in flush position.

13. The door handle according to claim 1, wherein the handle lever comprises a graspable body, which the user will grasp, and a hidden body, hidden in the frame and located radially close to the handle lever axis, so that the graspable body is totally protruding when the handle lever is in open or ready position.

* * * * *